United States Patent Office 3,421,828
Patented Jan. 14, 1969

1

3,421,828
SULFURIC ACID ESTER DERIVATIVES OF 1-ANILINO - 4 - HYDROXY - ANTHRAQUINONE AND MIXTURES
Hans Peter Kölliker, Munchenstein, Basel-Land, and Peter Hindermann, Batterie, Bottmingen, Switzerland, assignors to J. R. Geigy A.G., Basel, Switzerland
No Drawing. Filed July 16, 1964, Ser. No. 383,254
Claims priority, application Switzerland, July 19, 1963, 9,050/63, 9,051/63; June 3, 1964, 7,239/64
U.S. Cl. 8—25                                17 Claims
Int. Cl. C09b 1/52

ABSTRACT OF THE DISCLOSURE

The present invention provides new substituted α-phenylamino-anthraquinone dyestuffs. In a first aspect there are provided dyestuffs falling under one of the formulas:

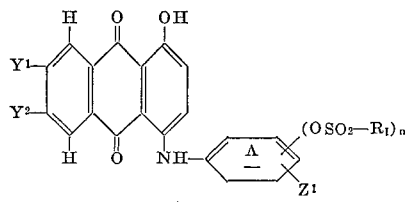

(III)

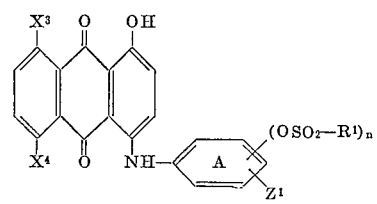

(IIIA)

and

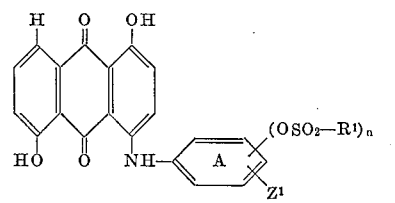

(IIIB)

in which formulas the respective symbols have the following meanings:

one of $X^3$ and $X^4$ represents hydroxy and the other represents hydroxy, nitro, amino, N-lower alkyl-amino, N,N-di-lower alkyl-amino, N-lower alkoxy-N-lower alkyl-amino or hydroxy-lower alkylamino,
each of $Y^1$ and $Y^2$ represents hydrogen, chlorine or bromine,
$R^1$ represents lower alkyl, alkenyl of from 2 to 4 carbon atoms, chloro-lower alkyl, chloro-lower alkenyl, cycloalkyl of from 5 to 7 carbon atoms, phenyl, chlorophenyl, bromophenyl, fluorophenyl, lower alkyl-phenyl, lower alkoxy-phenyl, (chloro-lower alkyl)-phenyl, (lower alkyl-sulfonyl)-phenyl, (lower alkyl-carbonyl)-phenyl, (lower alkanoyl-amino)-phenyl, (N-lower alkyl-sulfonyl-N-lower alkyl)-phenyl, or pyridyl-3-oxy,

2

$Z^1$ represents from one to two of the following: hydrogen, lower alkyl, lower alkoxy, chlorine, bromine, lower alkyl-sulfonyl, and lower alkyl-sulfonyl-amino, and
$n$ has the above-given meaning;

preferably the benzene ring A is not further substituted or, if substituted, it contains chlorine, or methyl or methoxy.

In a particular aspect a dyestuff composition is provided consisting essentially of a dyestuff of the formula

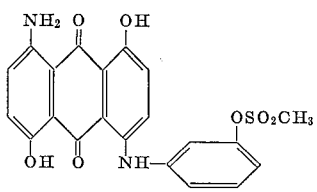

mixed with a dyestuff of the formula

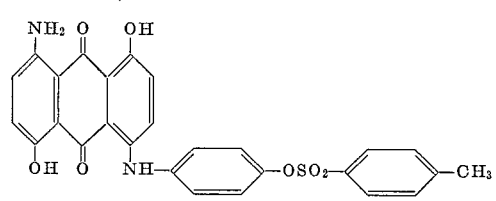

in a weight ratio of about 1:1.

According to a second aspect of the invention dyestuffs are provided falling under one of the formulas

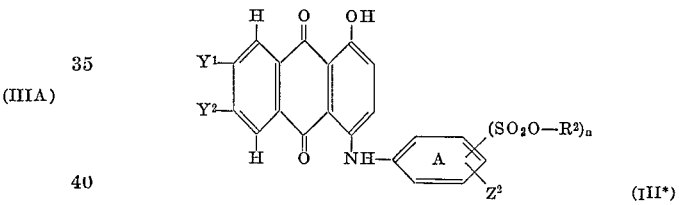

(III*)

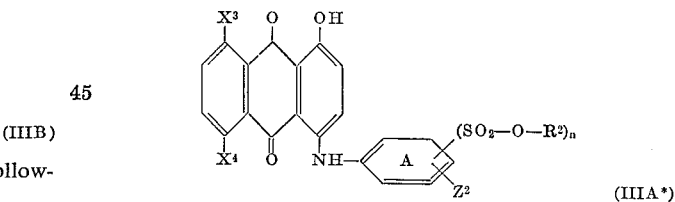

(IIIA*)

and

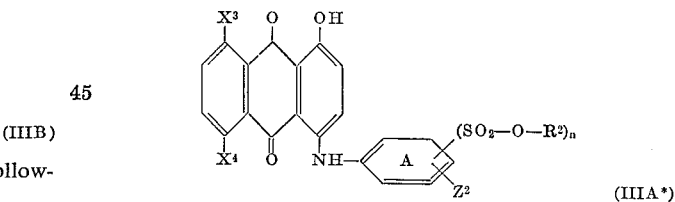

(IIIB*)

in which formulas the respective symbols have the following meanings:

$n$, $X^3$ and $X^4$ have the same meanings as in Formulas III, IIIA and IIIB, respectively;

$R^2$ represents alkyl of from 4 to 10 carbon atoms, chloro-lower alkyl, cycloalkyl of from 5 to 7 carbon atoms, phenyl, chlorophenyl, bromophenyl, fluorophenyl, lower alkylphenyl, lower alkoxyphenyl, chloro-lower alkyl-phenyl, (lower alkyl-sulfonyl)-phenyl, (lower alkyl-carbonyl)-phenyl, (lower alkanoyl-amino)-phenyl, (lower alkyl-sulfonyl)-phenyl, (N-lower alkyl-sulfonyl-N-lower alkyl-amino)-phenyl, benzyl, chloro-benzyl, bromo-benzyl, lower alkyl-benzyl, or pyridyl-(3)-, and $Z^2$ represents from one to two of the following substituents: hydrogen, lower alkyl, lower alkoxy, chlorine and bromine.

In a further aspect a dyestuff composition is provided consisting essentially of a dyestuff of the formula

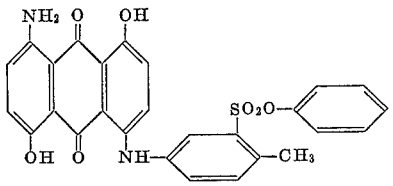

mixed with a dyestuff of the formula

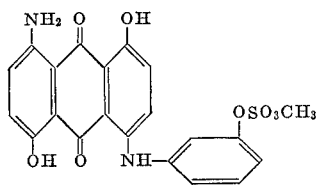

in a weight ratio of about 1:1.

---

The present invention concerns new substituted α-phenylamino-anthraquinone dyestuffs, processes for the production thereof, processes for the dyeing of polymeric ester fibers, in particular of fibers obtained from polymeric esters of aromatic polycarboxylic acids with polyvalent alcohols using the new dyestuffs and, as industrial product, the fibers dyed by the aid of these dyestuffs.

It has been found that, according to a first aspect of the invention, valuable substituted α-phenylamino-anthraquinone dyestuffs are obtained by reacting an anthraquinone compound of the formula

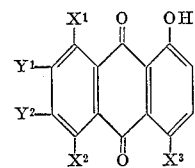

wherein of $X^1$ and $X^2$, one X is hydrogen or the hydroxyl group, the other X is hydrogen, the hydroxyl group and—if the first X is the hydroxyl group—the other X also represents the nitro group, the unsubstituted amino group or one which is substituted by a lower alkyl, lower alkoxy-lower alkyl or hydroxy-lower alkyl group, $X^3$ represents the hydroxyl group if $X^1$ and $X^2$ independently of each other represent hydrogen or the hydroxyl group and it represents the nitro group if one of $X_1$ and $X_2$ is the nitro group, the unsubstituted amino group or one which is substituted by lower alkyl, lower alkoxy or hydroxy-lower alkyl, and $Y^1$ and $Y^2$ preferably represent hydrogen or, provided that each of $X^1$ and $X^2$ are hydrogen, each Y can also be halogen, e.g. chlorine or bromine, with an amine of the formula

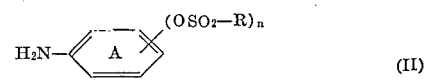

wherein

R represents an unsubstituted or substituted alkyl, alkenyl, cycloalkyl or aryl group, and n represents 1 or 2, preferably however 1, and the benzene ring A is unsubstituted or further substituted by substituents which do not dissociate acid in water, in particular by halogen, lower alkyl or lower alkoxy groups, whereby depending on a corresponding substitution of the starting materials, there are formed preferred dyestuffs falling under one of the formulas

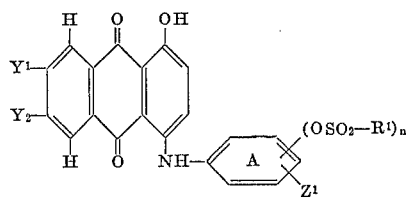

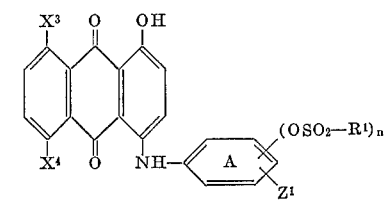

and

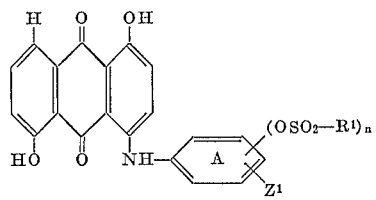

in which formulas the respective symbols have the following meanings:

one of $X^3$ and $X^4$ represents hydroxy and the other represents hydroxy, nitro, amino, N-lower alkyl-amino, N,N-di-lower alkyl-amino, N-lower alkoxy-N-lower alkyl-amino or hydroxy-lower alkyl-amino, each of $Y^1$ and $Y^2$ represents hydrogen, chlorine or bromine, $R^1$ represents lower alkyl, alkenyl of from 2 to 4 carbon atoms, chloro-lower alkyl, chloro-lower alkenyl, cycloalkyl of from 5 to 7 carbon atoms, phenyl, chlorophenyl, bromophenyl, fluorophenyl, lower alkyl-phenyl, lower alkoxyphenyl, (chloro-lower alkyl)-phenyl, (lower alkyl-sulfonyl)-phenyl, (lower alkyl-carbonyl)-phenyl, (lower alkanoyl-amino)-phenyl, (N-lower alkyl-sulfonyl-N-lower alkyl)-phenyl, or pyridyl-3-oxy, $Z^1$ represents from one to two of the following: hydrogen, lower alkyl, lower alkoxy, chlorine, bromine, lower alkyl-sulfonyl, and lower alkyl-sulfonyl-amino, and n has the above-given meaning;

preferably the benzene ring A is not further substituted or, if substituted, it contains chlorine, or methyl or methoxy.

The greater part of the starting materials of Formula I usable according to the invention are known; examples thereof are: 1,4-dihydroxy-, 1,4,5-trihydroxy-, 1,4,5,8-tetrahydroxy-, 1,4-dihydroxy-6-chloro-, 1,4-dihydroxy-6,7- dichloro-, 1,5-dinitro-4,8-dihydroxy- or 1,8-dinitro-4,5-dihydroxyanthraquinone. In the two latter mentioned compounds, a nitro group can also be replaced by an amino group which may be substituted by a low alkyl, alkoxyalkyl or hydroxyalkyl group.

"Lower" when used in this specification and the appended claims in connection with alkyl, alkanoyl or alkoxy means radicals having from 1 to 4 carbon atoms and when used with alkenyl, it means a radical having from 2 to 4 carbon atoms.

Some of the amines of Formula II to be reacted with these compounds of Formula I are known or they can be produced in the known manner, for example by reacting one mol of a nitrophenol of the formula

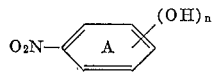

with $n$ mol of a sulphonic acid chloride or bromide of the formula $$Hal-O_2S-R$$

wherein

Hal represents chlorine or bromine and R has the meaning given in Formula II, and subsequently reducing the nitro group to the amino group. When R represents a halogenomethyl group, the reduction should be carried out under mild conditions.

The reaction of the starting materials of Formula I containing nitro groups with the amines of Formula II is performed, for example, with an excess of amine in the melt at about 100 to 250° C., advantageously however, in an organic solvent which boils at about 110 to 220° C. Suitable organic solvents are, e.g. aromatic hydrocarbons which may be halogenated or nitrated such as xylenes, or monochlorobenzene or dichlorobenzenes, or nitrobenzene, also alcohols such as as alkanols having at least 4 carbon atoms, e.g. butanol or amyl alcohol, or alkylene glycols and their monoalkyl ethers. The preferred organic solvent is nitrobenzene.

Starting materials of Formula I which do not contain nitro groups are reacted with the amines of Formula II, preferably in the presence of boric acid or its alkali metal salts. In this reaction the starting materials of Formula I can also be used in the form of their leuco compounds or mixed with their leuco compounds.

If amines of Formula II are used in which both o-positions are further substituted, the use of a 1,3-alkane diol with boric acid, which diol forms with the boric acid a cyclic ester, or the use of a 1,3-alkane diol boric acid ester is recommended.

If the nitro group smybolised by $X_1$ or $X_2$ in the dyestuffs of Formula III is to be replaced by the amino group or by a low alkylamino, alkoxyalkylamino, or hydroxyalkylamino group, this is done preferably by reducing the nitro group to the amino group and, if desired, substituting the latter by a low alkyl, alkoxyalkyl or hydroxyalkyl group by means of a usual alkylating agent.

A modification of the process for the production of new substituted α-phenylamino-anthraquinone dyestuffs consists in reacting an anthraquinone compound of Formula IV

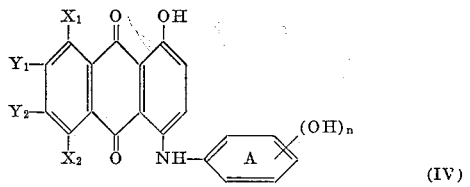

wherein $X_1$, $X_2$, $Y_1$, $Y_2$, $n$ and A have the meanings given in Formulae I or II, with the chloride or bromide of an organic sulphonic acid of Formula V $$Hal-O_2S-R \qquad (V)$$

wherein

Hal represents chlorine or bromine and
R has the meaning given in Formula II, to form a compound of Formula III, and optionally, reducing a nitro group symbolised by $X_1$ or $X_2$ in Formula III by the amino group or by a low alkylamino, alkoxyalkylamino or hydroxyalkylamino group.

The starting compounds of Formula IV are obtained, for example, by reacting an anthraquinone compound of Formula I with an amine of the formula

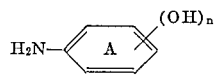

whereby the reaction conditions described in the first process pertain here too.

The compound of Formula IV is condensed with the sulphonic acid chloride or bromide of Formula V in the usual way, e.g. in an organic solvent which is inert to both reaction partners, optionally in the presence of an acid binding agent, preferably in aqueous-pyridine or aqueous-alkaline solution or suspension.

The new substituted α-phenylamino-anthraquinones of Formula III generally crystallise out of the reaction mixture. They are isolated by filtration, dilution of the mixture with water or with a low alcohol or by removal of the organic solvent by distillation or steam distillation and they can be purified by recrystallisation.

In a pure state, the new dyestuffs are shimmering, crystalline, deeply coloured compounds. They dissolve in hot organic solvents with a pure violet to blue colour. From an aqueous dispersion they dye polymeric ester fibres, e.g. cellulose esters such as cellulose triacetate, preferably however fibres obtained from polymeric esters of aromatic polycarboxylic acids with polyvalent alcohols, e.g. polyethyleneglycol terephthalate fibres, in violet to blue shades.

Fibers obtained from polymeric esters of aromatic polycarboxylic acids with polyvalent alcohols are dyed with aqueous dispersions of the dyestuffs according to the invention preferably at temperatures of over 100° C. under pressure. Very good dyeings are also obtained by impregnating these fibres with concentrated, aqueous dispersions of the dyestuffs according to the invention, drying the squeezed out fabric and then fixing the dyeing at temperatures of 180 to 250° C. The dyeing can also be performed, however, at the boiling point of the water in the presence of carriers such as phenylphenol, polychlorobenzene compounds or similar auxiliaries.

In many cases, the drawing power and also the dispersibility of the dyestuffs in the dye liquor can be still further improved by mixing two or more dyestuffs of which at least one corresponds to Formula III. The violet to blue dyeings attained on the fibres mentioned with the dyestuffs according to the invention have considerably better fastness to sublimation and, in particular, to light than dyeings obtained with known dyestuffs of similar constitution. They also have very good wet fastness properties.

The following examples illustrate the invention. Where not otherwise expressly stated, parts are given as parts by weight. The temperatures are in degrees centigrade. The relationship of parts by weight to parts by volume is as that of grammes to cubic centimetres.

EXAMPLE 1

16 parts of boric acid are added to a mixture of 18 parts of quinizarin, 6 parts of leucoquinizarin and 37.4 parts of methane sulphonic acid-3-aminophenyl ester and the whole is stirred for 1 hour in 50 parts of ethyl alcohol at 80–85°. At the end of this time, the reaction mixture has become dark brown-violet coloured. After the addition of 100 parts ethyl alcohol and of 0.5 part of sodium perborate, it is slowly allowed to cool to room temperature while stirring.

The reaction product which separates out in crystalline form of the formula

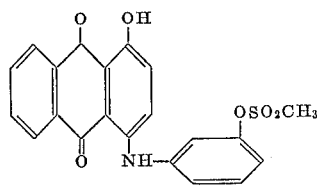

is filtered off, washed with boiling methyl alcohol, hot water which has been made weakly alkaline and, finally, with hot water until the washing liquor is neutral, and dried.

The dyestuff can also be recrystallised from ethylene glycol monoethyl ether, chlorobenzene or pyridine. It forms beautiful dark crystals having a green-golden shimmer and melts at 209–210°. It dissolves in organic solvents with a clear reddish violet and in concentrated sulphuric acid with a dark blue colour.

From an aqueous dispersion, it dyes polyethylene glycolterephthalate fibres in clear violet shades which are very fast to sublimation, light and wet.

The same dyestuff is also obtained if, instead of the 37.4 parts of methane sulphonic acid - 3 - aminophenyl ester, 21.8 parts of 3-aminophenol are used and the reaction is otherwise performed as described. The product which is isolated by filtration, is subsequently slurried in a mixture of 200 parts of water and pyridine (1:1) whereupon 17.2 parts of methane sulphonic acid chloride are added dropwise at 5–10° within 1 hour; the slurry is then heated for 2 hours at 40–50°.

The reaction product which is practically completely separated out by dilution with 200 parts of water is obtained by filtration. It corresponds in every respect to the dyestuff obtained by the reaction first mentioned above.

EXAMPLE 2

33 parts of 1,5 - dinitro - 4,8 - dihydroxyanthraquinone are slurried in 150 parts of nitrobenzene and, after the addition of 41.14 parts of methane sulphonic acid 4-amino phenyl ester, this suspension is heated to 180° within half an hour; the greater part of the reaction products are thus dissolved. The reaction mixture is kept for 3 hours at this temperature while stirring well, and the water formed during the reaction is continuously distilled off from the solution which gradually turns a clear blue colour.

On completion of the reaction, the solution is slowly cooled to room temperature while stirring constantly, whereupon the reaction product of the formula

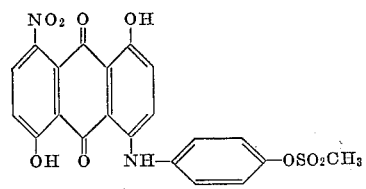

separates out in fine crystalline form. It is filtered off, washed with a mixture of nitrobenzene and methanol, then with methanol alone, then with 90° warm, strongly diluted sodium hydroxide solution and finally with hot water until the washing liquor is neutral.

The purity of the dyestuff so obtained can hardly be improved by recrystallisation. The fine, blue-black crystals melt at 276–278°. The dyestuff dissolves in organic solvents with a clear blue, in concentrated sulfuric acid with a green colour.

From an aqueous dispersion it dyes polyethylene glycolterephthalate fibres in particular in clear blue shades which have very good sublimation, light and wet fastness properties.

If instead of the 41.14 parts of methane sulphonic acid-4-aminophenyl ester the same number of parts of methane sulphonic acid - 3 - aminophenyl ester are used, the duration of the reaction is extended to 6 hours and otherwise the procedure is as described, then a very similar dyestuff is obtained which, to all intents and purposes, has identical fastness properties.

EXAMPLE 3

33 parts of 1,5 - dinitro - 4,8 - dihydroxyanthraquinone and 27 parts of m-aminophenol are stirred for 8 hours at 130–135° in 500 parts of ethylene glycol monoethyl ether. The clear blue reaction mixture is concentrated by distilling off the greater part of the solvent in vacuo, the sirupy residue is stirred several times with 40° warm water which has been made weakly soda alkaline and then with 250 parts of methanol, and the pulverulent blue precipitate is filtrated off.

While still moist, the residue is slurried in 400 parts of 40° warm water and partly dissolved by the addition of 200 parts of pyridine. 37.4 parts of methane sulphonic acid chloride are added dropwise at 35–40° while stirring well, the addition being made to the slurry within half an hour, the whole is kept for another hour at this temperature and then the reaction mixture is diluted with 400 parts of ice water.

The dark blue reaction product which is precipitated in this way is filtered off and washed netural with water.

This product is again slurried in a mixture of 400 parts of water and 400 parts of pyridine at 90–95° and then 11.2 parts of sodium hydrogen sulphide are added all at once.

After 10 minutes, the mixture is diluted with 2000 parts of ice water. The dyestuff so precipitated of the formula

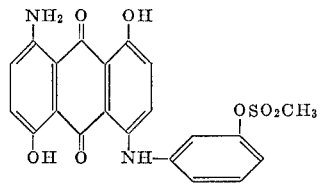

is filtered off, washed neutral with hot water and then dried.

The compound of the above formula obtained in a high yield in this way melts at 207–208°. It dissolves in organic solvents with a clear blue, in concentrated sulphuric acid with a green colour.

Very pure blue dyeings are obtained from the aqueous dispersion of the dyestuff on polyglycol terephthalate fibres. The dyeings have particularly good sublimation and water fastness properties.

If the 27 parts of m-aminophenol are replaced by a mixture of 17 parts of m-aminophenol and 10 parts of p-aminophenol and otherwise the reaction is performed as described above, then a very similar dyestuff is obtained. Very strong dyeings are obtained from its aqueous dispersion on polyterephthalate and cellulose acetate fibres which have excellent sublimation, light and wet fastness properties.

EXAMPLE 4

If in Example 1, the 37.4 parts of methane sulphonic acid-3-aminophenyl ester are replaced by the same number of parts of methane sulphonic acid-4-aminophenyl ester and the condensation is performed at 60–65° with otherwise the same reaction partners, then a very similar dyestuff of the formula

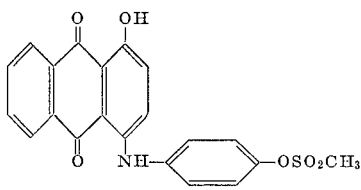

is obtained.

It melts at 179–180° and it dissolves in organic solvents with a reddish violet, in concentrated sulphuric acid with a dark blue colour.

From an aqueous dispersion, it dyes polyglycol terephthalate fibres in reddish violet shades which are very fast to light and sublimation.

On mixing this dyestuff in a ratio of 1:1 with the structurally related monocondensation product of quinizarin and 3-methylsulphonylamino aniline, a somewhat more blueish violet dyestuff is obtained. This dyestuff draws from an aqueous dispersion onto polyglycol terephthalate and cellulose acetate fibres in deep, clear reddish violet shades which have excellent fastness to light, sublimation, wet and industrial fumes.

EXAMPLE 5

39.3 parts of methane sulphonic acid-4-aminophenyl ester are mixed with 33 parts of 1,8-dinitro-4,5-dihydroxy-anthraquinone and the mixture is poured all at once into 180 parts of nitrobenzene at 180°. This temperature is maintained for 7 hours while stirring well, then the solvent is completely distilled off by introducing steam and the precipitated dyestuff of the formula

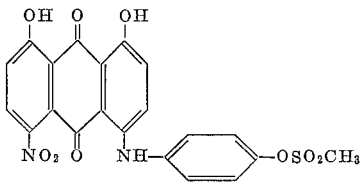

is separated by filtration from the acidified solution. It is washed on the filter with very greatly diluted hydrochloric acid solution, then with greatly diluted hot sodium hydroxide solution and finally with hot water until the washing liquor is neutral.

Recrystallised from nitrobenzene, the dyestuff melts at 234–236°. It dissolves in organic solvents with a blue, in concentrated sulphuric acid with a greenish yellow colour.

From an aqueous dispersion, the dyestuff dyes polyglycol terephthalate fibres in blue shades which have excellent light, sublimation and wet fastness properties.

A very similar dyestuff is obtained if the dyestuff of the above formula is mixed in a ratio of 1:1 with the dyestuff mentioned in Example 3. Extraordinarily strong blue dyeings are attained with this dyestuff mixture on polyglycol terephthalate and cellulose acetate fibres which are very fast to sublimation, light and wet.

EXAMPLE 6

33 parts of 1,5-dinitiro-4,8-dihydroxyanthraquinone and a mixture of 20.46 parts of methane sulphonic acid-3-aminophenyl ester and 28.93 parts of p-toluene sulphonic acid-4-aminophenyl ester are slurried in 160 parts of nitrobenzene, this mixture is heated to 190° within half an hour and kept at this temperature while stirring well for 5 hours. 160 parts of methanol are added at 70° to the clear dark blue solution obtained and then it is cooled to room temperature whereupon the reaction product separates out as a fine blue powder. This is filtered off, washed with boiling methanol and water and then, while still moist, is slurried at 90–95° in 800 parts of a 50% aqueous pyridine solution.

A concentrated aqueous solution of 11.2 parts of sodium hydrogen sulphide is added dropwise to this suspension within 5 minutes while stirring strongly and then the reaction mixture is kept for another 5 minutes at 90–100°. 1500 parts of ice water are then added to the greenish blue suspension, the precipitated mixture of the dyestuffs

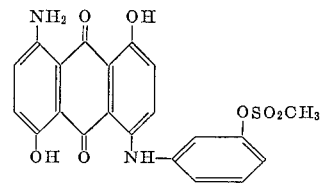

and

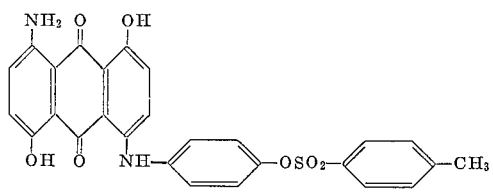

is filtered off at room temperature and washed with hot water until the reaction is neutral.

Polyethylene glycol terephthalate and cellulose acetate fibres can be dyed from an aqueous dispersion of this mixture of dyestuffs in strong, clear blue shades which have extraordinary sublimation and wet fastness properties.

On alkylating these products with dimethyl sulphate, the corresponding N-monomethylamino-anthraquinones are obtained which have properties similar to the amino-anthraquinones described above.

EXAMPLE 7

16 parts of boric acid are added to a mixture of 18 parts of quinizarin, 6 parts of leucoquinizarin and 44.3 parts of chloromethane sulphonic acid-3-aminophenyl ester, and the mixture is stirred for 1 hour in 50 parts of ethyl alcohol at 80–85°. At the end of this time, the reaction mixture shows a dark brown-violet colour. It is then mixed with 100 parts of ethyl alcohol. After the addition of 0.5 part of sodium perborate, it is allowed to cool slowly at room temperature while being stirred.

The reaction product having the formula

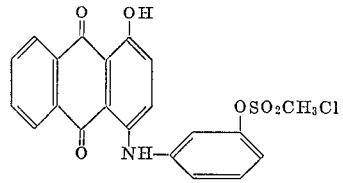

separates out in crystalline form and is filtered off, washed with boiling methyl alcohol, hot water which has been made weakly alkaline and, finally, with hot water until the washing liquor is neutral. Then the product is dried.

The dyestuff can in addition be recrystallized from ethylene glycol monoethyl ether, chlorobenzene or pyridine. It forms beautiful dark crystals having a green-golden shimmer. It dissolves in organic solvents with a clear reddish-violet, and in concentrated sulphuric acid with a dark blue colour.

From an aqueous dispersion, it dyes polyethylene glycol terephthalate fibres in clear violet shades which are very fast to sublimation, light and wet processing.

The same dyestuff is obtained, if 21.8 parts of 3-aminophenol are used instead of the 44.3 parts of chloromethane sulphonic acid-3-amonophenyl ester and the reaction is otherwise carried out as described. The product isolated by filtration is slurried in a mixture of 200 parts of water and pyridine (ratio 1:1) whereupon 22.35 parts of chloromethane sulphonic acid chloride are added dropwise within 1 hour at 5–10°; the slurry is then heated for another two hours at 40–50°.

The reaction product which is separated out practically completely by dilution with 200 parts of water is obtained by filtration; it corresponds in every respect to the dyestuffs obtained by the first-described reaction.

EXAMPLE 8

33 parts of 1,5-dinitro-4,8-dihydroxyanthraquinone are slurried in 150 parts of nitrobenzene and, after the addition of 48.8 parts of chloromethane sulphonic acid-4-aminophenyl ester, this suspension is heated within half an hour to 180°; the greater part of the reactants is thus dissolved. The reaction mixture is kept for 4 hours at this temperature while being stirred well, and the water formed during the reaction is continuously distilled off from the solution which gradually turns a clear blue colour.

On completion of the reaction, the solution is slowly cooled to room temperature with constant stirring, whereupon the reaction product of the formula

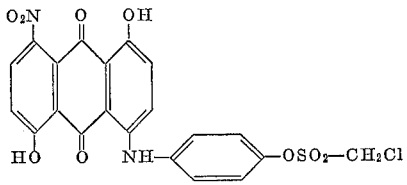

separates out in fine crystalline form. It is filtered off, washed with a mixture of nitrobenzene and methanol, then with methanol alone, then with 90° warm, strongly diluted aqueous sodium hydroxide solution and finally with hot water until the washing liquor is neutral.

The purity of the dyestuff so obtained can be further improved by recrystallisation. The fine blue-black crystals melt at 215–216°. The dyestuff dissolves in organic solvents with a clear blue, in concentrated sulphuric acid with a green colour.

From an aqueous dispersion, it dyes in particular polyethylene glycol terephthalate fibres in clear blue shades which have very good fastness to sublimation, light and wet processing.

If instead of the 48.8 parts of chloromethane sulphonic acid-4-aminophenyl ester, 58.5 parts of bromomethane sulphonic acid-3-aminophenyl ester are used, the duration of the reaction is extended to 5 hours, and the procedure is otherwise as described, then a very similar dyestuff is obtained, which has practically identical fastness properties.

EXAMPLE 9

33 parts of 1,5-dinitro-4,8-dihydroxyanthraquinone and 27 parts of m-aminophenol are stirred for 8 hours at 130–135° in 500 parts of ethylene glycol monoethyl ether. The clear blue reaction mixture is concentrated by distilling off the greater part of the solvent in vacuo, while the sirupy residue is stirred several times with 40° warm water which has been made weakly soda alkaline, and then with 250 parts of methanol, whereupon the pulverulent blue precipitate is filtered off.

While still moist, the residue is slurried in 400 parts of 40° warm water and partly dissolved by the addition of 200 parts of pyridine. 44.3 parts of chloromethane sulphonic acid chloride are added dropwise within half an hour at 35–40° while stirring well, and the mixture is kept for another hour at this temperature. Then it is diluted with 400 parts of ice water.

The dark blue reaction product which is precipitated in this way is filtered off and washed with water until it has become neutral.

This product is again slurried in a mixture of 400 parts of water and 400 parts of pyridine at 90–95°, and then 11.2 parts of sodium hydrogen sulphide are added all at once.

After 10 minutes, the mixture is diluted with 2000 parts of ice water. A dyestuff precipitates which has the formula

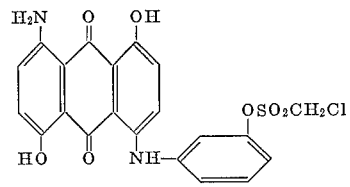

It is filtered off, washed neutral with hot water and dried. The compound of the above formula thus obtained in a high yield dissolves in organic solvent with a clear blue, in concentrated sulphuric acid with a green colour.

Very pure blue dyeings are obtained from the aqueous dispersion of the dyestuff on polyethylene glycol terephthalate fibres. The dyeings have particularly good sublimation and water fastness properties.

If the 27 parts of m-aminophenol are replaced by a mixture of 17 parts of m-aminophenol and 10 parts of p-aminophenol, and the reaction is otherwise performed as described above, then a very similar dyestuff is obtained. Very strong dyeings of excellent sublimation, light and wet fastness properties are obtained from its aqueous dispersion on polyethylene glycol terephthalate and cellulose acetate fibres.

EXAMPLE 10

2 parts of the finely milled mixture of dyestuffs obtained according to Example 6 are dispersed in 4000 parts of water. 12 parts of the sodium salt of o-phenylphenol and 12 parts of diammonium phosphate are added to this fine dispersion and 100 parts of a polyglycol terephthalate fabric are dyed for 1½ hours at 95–98°. The dyeing is rinsed and thoroughly washed with dilute sodium hydroxide solution and a dispersing agent, e.g. the condensation product of naphthalene sulphonic acid and formaldehyde. A blue dyeing is obtained which is fast to light, wet and sublimation.

EXAMPLE 11

2 parts of the finely ground dyestuff obtained according to Example 1 are distributed in 4000 parts of water containing 2 parts of a condensation product of naphthalene sulphonic acid and formaldehyde. The pH of the dyebath is adjusted to 6.5 with acetic acid. 100 parts of polyglycol terephthalate fabric are introduced at 40°, the bath is heated in an autoclave to 120° within 15 minutes and kept at this temperature for 45 minutes. The dyeing is rinsed with water and then soaped. A clear violet dyeing is obtained which has excellent sublimation, light and wet fastness properties.

The following table shows the shades on polyethylene glycol terephthalate fibres which are obtained with other dyestuffs which can be produced by methods analogous to those described in the above examples.

TABLE

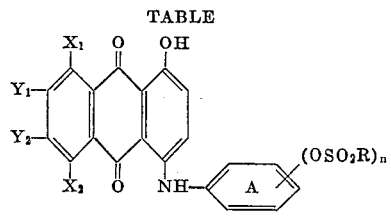

| Example No. | $X_1$ | $X_2$ | $Y_1$ | $Y_2$ | $[-NH-A-(OSO_2R)_n]$ | Shade on polyglycol terephthalate fibres |
|---|---|---|---|---|---|---|
| 12 | H | H | H | Cl | —NH—⟨C₆H₄⟩—OSO₂CH₃ (ortho) | Violet. |
| 13 | OH | NO₂ | H | H | —NH—⟨C₆H₄⟩—OSO₂CH=CH₂ (with OSO₂CH₃) | Blue. |
| 14 | NH₂ | OH | H | H | —NH—⟨C₆H₃(Cl)⟩—OSO₂CH₃ | Do. |
| 15 | H | OH | H | H | —NH—⟨C₆H₃(OCH₃)⟩—OSO₂CH₃ | Violet. |
| 16 | OH | NO₂ | H | H | —NH—⟨C₆H₃(NHSO₂CH₃)⟩—OSO₂CH₃ | Blue. |
| 17 | NHCH₃ | OH | H | H | —NH—⟨C₆H₄⟩—OSO₂—⟨C₆H₁₁⟩H | Do. |
| 18 | H | H | H | H | —NH—⟨C₆H₄⟩—OSO₂—⟨C₆H₄⟩—CH₃ | Violet. |
| 19 | NO₂ | OH | H | H | —NH—⟨C₆H₄⟩—OSO₂CH₂—C(CH₃)=CH₂ | Blue. |
| 20 | H | H | Cl | Cl | —NH—⟨C₆H₄⟩—OSO₂CH₃ | Violet. |
| 21 | NH₂ | OH | H | H | —NH—⟨C₆H₄⟩—OSO₂CH₂CH₃ | Blue. |
| 22 | OH | NO₂ | H | H | —NH—⟨C₆H₃(Cl)⟩—OSO₂—⟨C₆H₄⟩—CH₃ | Do. |
| 23 | NH₂ | OH | H | H | —NH—⟨C₆H₃(Cl)⟩—OSO₂CH₃ | Do. |
| 24 | OH | NHCH₂CH₂OCH₃ | H | H | —NH—⟨C₆H₄⟩—OSO₂CH₃ | Do. |
| 25 | H | H | H | H | —NH—⟨C₆H₂(CH₃)₂⟩—OSO₂CH₃ | Violet. |

3,421,828

TABLE—Continued

| Example No. | X₁ | X₂ | Y₁ | Y₂ | $[-NH-A-(OSO_2R)_n]$ | Shade on polyglycol terephthalate fibres |
|---|---|---|---|---|---|---|
| 26 | NO₂ | OH | H | H | —NH—C₆H₃(OSO₂CH₃)(OCH₃) (2-OSO₂CH₃, 5-OCH₃) | Blue. |
| 27 | H | H | H | H | —NH—C₆H₃(OSO₂CH₃)₂ (2,5-di-OSO₂CH₃) | Violet. |
| 28 | OH | NHCH₂CH₂OH | H | H | —NH—C₆H₄—OSO₂CH₃ | Blue. |
| 29 | H | H | H | H | —NH—C₆H₄—OSO₂CH₂CH₂CH₂CH₃ | Violet. |
| 30 | OH | OH | H | H | —NH—C₆H₄—OSO₂CH₃ | Blue-Violet. |
| 31 | NO₂ | OH | H | H | —NH—C₆H₄—OSO₂CH₂—C₆H₅ | Blue. |
| 32 | NH₂ | OH | H | H | —NH—C₆H₃(C₄H₉)(OSO₂CH₃) | Do. |
| 33 | H | H | H | H | —NH—C₆H₃(CH₃)(OSO₂—C₆H₄—CH₃) | Violet. |
| 34 | NO₂ | OH | H | H | —NH—C₆H₃(CH₃)(OSO₂CH₃) | Blue. |
| 35 | H | H | H | H | —NH—C₆H₄—OSO₂—C₆H₄—CH₃ | Violet. |
| 36 | OH | NH₂ | H | H | —NH—C₆H₃(Br)(OSO₂CH₃) | Blue. |
| 37 | NHCH₂CH₂CH₂OH | OH | H | H | —NH—C₆H₄—OSO₂—C₆H₅ | Do. |
| 38 | H | H | H | H | —NH—C₆H₄—OSO₂CH₂CH(CH₃)₂ | Violet. |
| 39 | H | H | H | H | —NH—C₆H₃(C₅H₁₁)(OSO₂CH₃) | Do. |
| 40 | H | H | H | H | —NH—C₆H₃(SO₂CH₃)(OSO₂CH₃) | Do. |

TABLE—Continued

| Example No. | X₁ | X₂ | Y₁ | Y₂ | $\left[-NH-\underset{A}{\bigcirc}(OSO_2R)_n\right]$ | Shade on polyglycol terephthalate fibres |
|---|---|---|---|---|---|---|
| 41 | OH | NH₂ | H | H | −NH−C₆H₃(OCH₃)(OSO₂CH₂CH₂CH₃) | Blue. |
| 42 | H | H | H | H | −NH−C₆H₃(OSO₂CH₃)(OSO₂CH₃) | Violet. |

| Example No. | X₁ | X₂ | Y₁ | Y₂ | $\left[-NH-\underset{A}{\bigcirc}(OSO_2R)_n\right]$ | Shade on polyethylene glycol terephthalate fibres |
|---|---|---|---|---|---|---|
| 43 | NO₂ | OH | H | H | −NH−C₆H₄−OSO₂−C₆H₄−OCH₃ | Blue. |
| 44 | H | H | H | H | −NH−C₆H₄−OSO₂−C₆H₄−SO₂CH₃ | Violet. |
| 45 | H | H | H | H | −NH−C₆H₄−OSO₂−C₆H₄−COOCH₃ | Do. |
| 46 | OH | NH₂ | H | H | −NH−C₆H₄−OSO₂−C₆H₄−NHSO₂CH₃ | Blue. |
| 47 | NH₂ | OH | H | H | −NH−C₆H₄−OSO₂−C₆H₄−N(CH₃)SO₂CH₃ | Do. |
| 48 | H | H | H | H | −NH−C₆H₄−OSO₂−C₆H₄−CH₂Cl | Violet. |
| 49 | H | H | H | H | −NH−C₆H₄−OSO₂C(=CH₂)Cl | Do. |
| 50 | NH₂ | OH | H | H | −NH−C₆H₄−OSO₂CH=C(CH₃)−CH₂−Cl | Blue. |
| 51 | H | OH | H | H | −NH−C₆H₄−OSO₂CH₃ | Violet. |
| 52 | OH | NH₂ | H | H | −NH−C₆H₄−OSO₂CH₃ | Blue. |
| 53 | H | H | H | Cl | −NH−C₆H₄−OSO₂CH₂Cl | Violet. |
| 54 | OH | NO₂ | H | H | −NH−C₆H₄−OSO₂CH₂Cl | Blue. |

TABLE—Continued

| Example No. | X₁ | X₂ | Y₁ | Y₂ | $\left[-NH-\underset{}{A}-(OSO_2R)_n\right]$ | Shade on polyethylene glycol terephthalate fibres |
|---|---|---|---|---|---|---|
| 55 | NH₂ | OH | H | H | —NH—⟨phenyl⟩ with OSO₂CH₂Cl | Do. |
| 56 | H | OH | H | H | —NH—⟨phenyl⟩—OSO₂CH₂Cl, with CH₃O | Violet. |
| 57 | OH | NO₂ | H | H | —NH—⟨phenyl⟩ with OSO₂CH₂Br | Blue. |
| 58 | NHCH₃ | OH | H | H | —NH—⟨phenyl⟩—OSO₂CH₂Cl | Do |
| 59 | H | H | H | H | —NH—⟨phenyl⟩—OSO₂CH₂Br | Violet. |
| 60 | H | H | Cl | Cl | —NH—⟨phenyl⟩—OSO₂CH₂Cl | Do. |
| 61 | H | H | H | H | —NH—⟨phenyl⟩—OSO₂CH₂Cl, with CH₃ and CH₃ | Do. |
| 62 | NO₂ | OH | H | H | —NH—⟨phenyl⟩—OSO₂CH₂Cl, with CH₃ | Blue. |

According to a second aspect of the invention, valuable substituted α-phenylamino-anthraquinone dyestuffs are obtained by reacting an anthraquinone compound of the formula

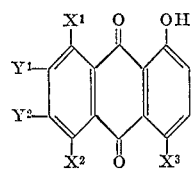

(I*)

wherein $X^1$, $X^2$, $X^3$, $Y^1$ and $Y^2$ have the same meanings as in Formula I, with an amine of the formula

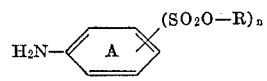

(II*)

wherein

R represents an aliphatic radical having at least 4 carbon atoms, an araliphatic, a cycloaliphatic or a carbocyclic-aromatic or a 3-pyridyl radical, and $n$ is 1 or 2, preferably however 1, and the benzene ring A is unsubstituted or is further substituted by halogen, lower alkyl or lower alkoxy, whereby, depending on a corresponding substitution of the starting materials, there are formed preferred dyestuffs falling under one of the formulas

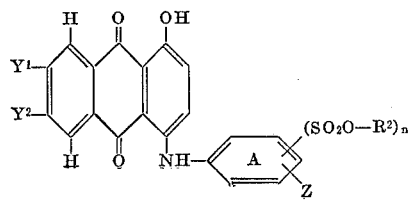

(III*)

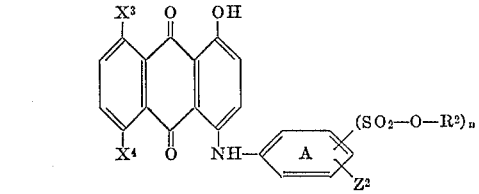

(IIIA*)

and

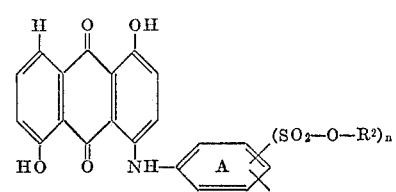

(IIIB*)

in which formulas the respective symbols have the following meanings:

$n$, $X^3$ and $X^4$ have the same meanings as in Formulas III, IIIA and IIIB, respectively;

$R^2$ represents alkyl of from 4 to 10 carbon atoms, chlorolower alkyl, cycloalkyl of from 5 to 7 carbon atoms, phenyl, chlorophenyl, bromophenyl, fluorophenyl, lower alkylphenyl, lower alkoxyphenyl, chloro-lower alkylphenyl(lower alkyl-sulfonyl)-phenyl, (lower alkyl-carbonyl)-phenyl, (lower alkanoyl-amino)-phenyl, (lower alkyl - sulfonyl) - phenyl, (N - lower alkyl - sulfonyl-N-lower alkyl - amino) - phenyl, benzyl, chloro - benzyl, bromo-benzyl, lower alkyl-benzyl, or pyridyl-(3)-, and $Z^2$ represents from one to two of the following substituents: hydrogen, lower alkyl, lower alkoxy, chlorine and bromine.

Where in the following specification, Formula III* is referred to, Formulas IIIA* and IIIB* are also meant.

Preferably, the benzene ring A is not further substituted or it contains methyl, methoxy, ethoxy or chlorine.

The greater part of the starting materials of Formula I* usable according to the invention are known; examples thereof are: 1,4 - dihydroxy-, 1,4,5 - trihydroxy-, 1,4,5,8-tetrahydroxy-, 1,4-dihydroxy-6-chloro, 1,4-dihydroxy-6,7-dichloro-, 1,5-dinitro-4,8-dihydroxy- or 1,8-dinitro-4,5-dihydroxy-anthraquinone. In the two latter mentioned compounds there can be an amino group which may be substituted by a low alkyl, alkoxyalkyl or hydroxyalkyl group, instead of a nitro group.

Some of the amines of Formula II* to be reacted therewith are known, or they can be produced in the known manner, for example by reacting one mol of a nitrobenzene sulphonic acid chloride of the formula

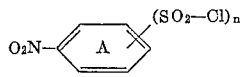

with $n$ mol of an organic hydroxyl compound R—OH, R having the meaning given in Formula II, and subsequently reducing the nitro group to the amino group.

The reaction of starting materials of Formula I* containing nitro groups with the amines of Formula II* is performed, for example with an excess of amine in the melt at about 100–250° C., advantageously however, in an organic solvent which boils at about 110°–220° C. Suitable organic solvents are, e.g. optionally halogenated or nitrated aromatic hydrocarbons such as xylenes, or monochlorobenzene or dichlorobenzenes, or nitrobenzene, also alcohols such as alkanols having at least 4 carbon atoms, e.g. butanol or amyl alcohol, or alkylene glycols and their monoalkyl ethers. The preferred organic solvent is nitrobenzene.

Starting materials of Formula I* which do not contain nitro groups are reacted with the amines of Formula II* preferably in the presence of boric acid or its alkali metal salts. In this reaction the starting materials of Formula I* can also be used in the form of their leuco compounds or in admixture with their leuco compounds.

If amines of Formula II* which are further substituted in both o-positions are used, the use of a 1,3-alkane diol with boric acid is recommended, which diol forms a cyclic ester, or of a 1,3-alkane diol boric acid ester.

In the dyestuffs of Formula III*, if a nitro group symbolised by $X_1$ or $X_2$ is to be replaced by the amino group or by a low alkylamino, alkoxyalkylamino, or hydroxyamino group, this is done preferably by reducing the nitro group to the amino group and, if desired, substituting the latter by a low alkyl, alkoxyalkyl or hydroxyalkyl group by means of an alkylating agent.

A modification of the process for the production of new substituted α-phenylamino-anthraquinone compounds containing no nitro group in the α-position consists in reacting an anthraquinone compound of formula

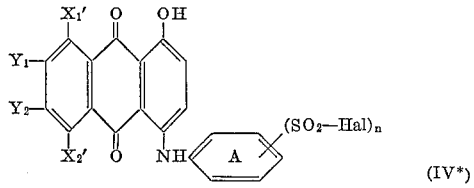

wherein
of $X_1'$ and $X_2'$, one is hydrogen or the hydroxyl group, the other is hydrogen, the hydroxyl group and—if the first X' is the hydroxyl group—also the amino group which is unsubstituted or one which is substituted by a low alkyl, alkoxyalkyl or hydroxyalkyl group,
$Y_1$ and $Y_2$ are hydrogen or, if each of $X_1'$ and $X_2'$ are hydrogen, they also represent halogen, and
wherein Hal is chlorine or bromine and $n$ is 1 or 2 and the benzene ring A is unsubstituted or is further substituted by halogen or by low alkyl or low alkoxy groups, with an organic hydroxyl compound of formula

HO—R    (V*)

wherein R is an aliphatic radical containing at least 4 carbon atoms, an araliphatic, a cycloaliphatic or a carbocyclic-aromatic radical, or reacting such anthraquinone compound of Formula IV* with an alkali metal salt of this organic hydroxyl compound of Formula V* to form a compound of Formula III'

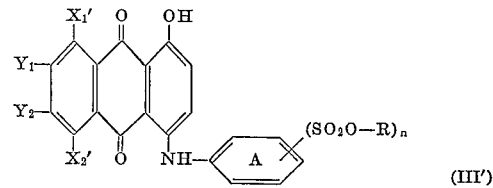

wherein $X_1'$, $X_2'$, $Y_1$, $Y_2$, R, $n$ and A have the meanings given in Formulae IV and V and, optionally, introducing a low alkyl, alkoxyalkyl or hydroxyalkyl group as substituent into the unsubstituted amino group symbolised by $X_1'$ or $X_2'$ in Formula III'.

The starting compounds of Formula IV* are obtained, for example, by reacting an anthraquinone compound of Formula I with an amine of the formula

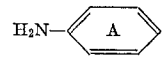

Naturally, the reaction conditions described in the first process pertain here too. On using an anthraquinone compound of Formula I* wherein one of $X_1$ and $X_2$ is the nitro group, the latter is then reduced to the amino group and, optionally, this is substituted by a low alkyl, alkoxyalkyl or hydroxyalkyl group, and the α-phenylamino-anthraquinone compounds are then converted in the known way, e.g. by reaction with chlorosulphonic acid or bromosulphonic acid into their sulphonic acid chlorides or bromides.

The condensation of the sulphonic acid chloride or bromide of Formula IV* with the compound of Formula V* or with an alkali metal salt of this compound is performed in the usual way, e.g. in an organic solvent which is inert to both reaction partners, optionally in the presence of an acid binding agent, preferably in aqueous-pyridine or aqueous-alkaline solution or suspension.

The new α-phenylamino-anthraquinones of Formula III generally crystallise out of the reaction mixture. They are isolated by filtration, dilution of the mixture with water or with a low alcohol or by removal of the organic solvent by distillation or steam distillation, and they can be purified by recrystallisation.

In a purse state, the new dyestuffs are shimmering, crystalline, deeply coloured compounds. They dissolve in hot organic solvents with a pure violet to blue colour. From an aqueous dispersion they dye polymeric ester fibres, for example cellulose ester fibres such as cellulose triacetate, preferably however, fibres from polymeric esters of aromatic polycarboxylic acids with polyvalent alcohols, e.g. polyethylene glycol terephthalate fibres, in violet to blue shades.

Fibres from polymeric esters of aromatic polycarboxylic acids with polyvalent alcohols are dyed with the aqueous dispersions of the dyestuffs according to the invention preferably at temperatures of over 100° C. under pressure. Very good dyeings are also obtained if these fibres are impregnated with concentrated aqueous dispersions of the dyestuffs according to the invention, the fabric is squeezed out, dried and then the dyeing is fixed at temperatures of 180–250° C. The dyeing can also be performed, however, at the boiling point of the water in the presence of carriers such as phenylphenol, polychlorobenzene compounds or similar auxiliaries.

In many cases the drawing power of the dyestuffs as well as their dispersibility in the dye liquor can even be improved by mixing two or more dyestuffs of which at least one corresponds to Formula III*. Compared with dyeings made with previously known dyestuffs of similar constitution, the violet to blue dyeings attained on the fibres mentioned with the dyestuffs according to the invention have considerably improved fastness to sub-limitation and light and have very good wet fastness properties.

In addition, compared with previously known dyestuffs, wool is considerably better preserved with the dyestuffs according to the invention.

The following examples illustrate the invention. Where not expressly stated, parts are given as parts by weight. The temperatures are in degrees centigrade. The relationship of parts by weight to parts by volume is as that of grammes to cubic centrimetres.

EXAMPLE 1

65.8 parts of 3-aminobenzene sulphonic acid-p-methylphenyl ester are thoroughly mixed with 33 parts of 1,5-dinitro-4,8-dihydroxy-anthraquinone in 300 parts of nitrobenzene and the mixture is stirred at 100° and slowly heated to 180–190°. The mixture is kept at this temperature for 12 hours, then the main amount of solvent is distilled off in vacuo, the dark blue residue is then stirred with 150 parts of ethylene glycol monoethyl ether at the boil and the reaction mixture is then cooled to room temperature.

The finely crystalline dyestuff which precipitates, of the formula

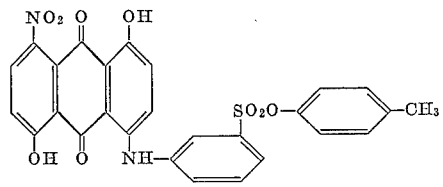

is filtered off, washed with ethylene glycol monoethyl ether, methanol and finally with water, and dried. It melts at 205–206° and dissolves in organic solvents with a clear reddish blue, in concentrated sulphuric acid with a blue-green colour.

It dyes polyglycol terephthalate fibres from aqueous dispersion in blue shades which are very fast to light, sublimation and wet.

54.6 parts of the dyestuff obtained according to this example are stirred at 90–95° in a mixture of 400 parts of water and 400 parts of pyridine. 11.2 parts of sodium hydrogen sulphide are added all at once to this mixture which is then kept for 10 minutes at 90° and afterwards diluted with 2000 parts of ice water. The dyestuff of the formula

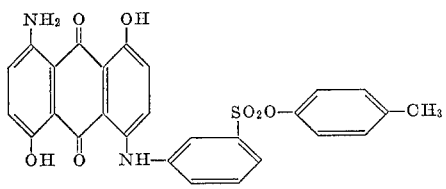

which is precipitated in this way in a fine form, is filtered off and washed neutral with hot water.

It is a dark blue powder which can be crystallised from nitrobenzene whereupon it then melts at 204–205° and dissolves in organic solvents with a clear blue, in concentrated sulphuric acid with a blue-green colour.

From an aqueous dispersion it dyes polyglycol terephthalate fibres in particular in clear blue shades which have very good sublimation, light and wet fastness properties.

On mixing this dyestuff with 1-(m-methylsulphonyloxy)-phenylamino-4,8-dihydroxy-5 - aminoanthraquinone, which is a dyestuff of related structure, a dyestuff is obtained which dyes polyglycol terephthalate fibres and cellulose acetate fibres in very strong blue shades having excellent fastness properties.

EXAMPLE 2

50 parts of 3-aminobenzene sulphonic acid phenyl ester and 33 parts of 1,5-dihydroxy-4,8-dinitroanthraquinone in 450 parts of nitrobenzene are heated for 8 hours at 190–200°. The mixture is then cooled to 90–100° and 300 parts of methanol are added all at once. The reaction mixture is then very slowly cooled to room temperature again within 2–3 hours whereupon the reaction product precipitates in the form of beautiful crystals which are filtered off and washed with methanol until the washing water is colourless.

The reaction product, while still moist, is then stirred into a mixture of 400 parts of water and 400 parts of pyridine, the slurry is warmed to 90° and at this temperature, 3.4 parts of sodium hydrogen sulphide are added to the mixture while stirring vigorously. After a further 5 minutes at this temperature, 800 parts of ice water are added to the mixture and the mixture of dyestuffs of the formula

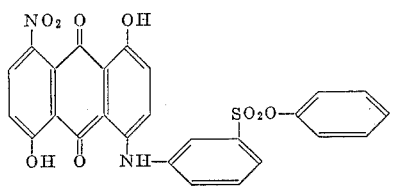

and

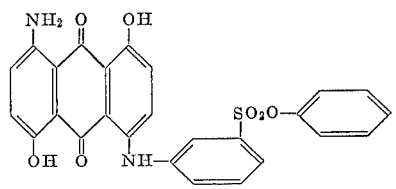

which is precipitated is filtered off. It is a dark blue powder and polyglycol terephthalate fibres are dyed from an aqueous dispersion thereof in strong, clear blue shades which have excellent sublimation, light and wet fastness properties.

EXAMPLE 3

40 parts of 3-aminobenzene sulphonic acid-p-methylphenyl ester, 16 parts of quinizarin and 8 parts of leuco quinizarin are heated to 50° in 70 parts of ethanol and 16 parts of boric acid are added all at once. The temperature is slowly raised to 80–85° while stirring slowly and this temperature is maintained for 5 hours. After the addition of 500 parts of ethanol, the reaction mixture is cooled to room temperature within 3 hours, whereupon the dyestuff of the formula

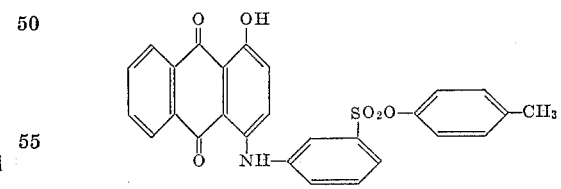

precipitates in crystalline form. It is filtered off, washed with ethanol and dried. After recrystallisation from ethylene glycol monoethyl ether it melts at 168–169°. It dissolves in organic solvents with a clear red-violet, in concentrated sulphuric acid with a violet-blue colour. It dyes polyglycol terephthalate fibres from an aqueous dispersion in clear, reddish violet shades which are very light, sublimation and wet fast.

A dyestuff which has the same good fastness properties and, at the same time, increased drawing power onto polyglycol terephthalate fibres is obtained by mixing equal parts of the dyestuff and the isomeric compound formed by monocondensation of quinizarin and p-toluene sulphonic acid-3-aminophenyl ester.

EXAMPLE 4

18 parts of quinizarin, 6 parts of leuco quinizarin, 58.6 parts of 2-amino-5-methylbenzene sulphonic acid guaiacol ester and 16 parts of boric acid are stirred in 80 parts of ethanol for 8 hours at 80–85°. After adding 200 parts of ethanol and a few drops of piperidine, air is directed for 1 hour at 40–50° through the mixture whereupon the latter is cooled to room temperature.

The dyestuff of the formula

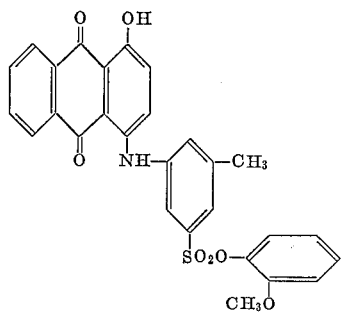

precipitates in the form of brownish violet crystals. It is separated from the mother liquor by filtration. The precipitate is washed with ethanol, very greatly diluted sodium hydroxide solution and then with water until the washing water has a neutral reaction whereupon it is dried.

It dissolves in organic solvents with a violet, in concentrated sulphuric acid with a blue colour. It dyes polyglycol terephthalate fibres from an aqueous dispersion in pure violet shades which have good sublimation, light and wet fastness properties.

The same dyestuff is also obtained in the following way: 32.9 parts of 1-hydroxy-4-p-toluidino-anthraquinone are added at 10–15° to 100 parts of chlorosulphonic acid and the whole is kept for 4 hours at this temperature. The dark blue solution is poured onto ice, the precipitate formed is filtered off, washed neutral and dried in vacuo. This product is added in small portions to a solution of 16 parts of the sodium salt of guaiacol in 100 parts of a 50% aqueous pyridine at 0–10° and then the solution is heated to 40–50° for 30 minutes. On diluting the reaction mixture with 500 parts of water, the dyestuff is almost quantitatively precipitated. It is filtered off, washed neutral and dried.

It corresponds in all its propetries to the product obtained by the first method.

EXAMPLE 5

78.5 parts of 3-amino-4-methoxybenzene sulphonic acid-p-chlorophenyl ester are added to a slurry of 33 parts of 1,5-dihydroxy-4,8-dinitro-anthraquinone in 400 parts of ethylene glycol monoethyl ether and the reaction mixture is stirred for 24 hours at the boiling temperature of the solvent. On cooling the solution, the condensation product precipitates in a finely crystalline form and is isolated by filtration.

It is slurried in 500 parts of an aqueous 50% pyridine solution and 11.2 parts of sodium hydrogen sulphide are added and the whole is kept for 10 minutes at a temperature of 90–100°.

On diluting with 1500 parts of cold water, the dyestuff of the formula

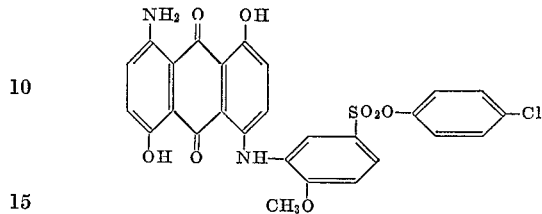

precipitates in crystalline form. It is filtered off, washed with water until the washing water has a neutral reaction and dried.

It dissolves in organic solvents with a clear blue, in concentrated sulphuric acid with a blue green colour. It dyes polyglycol terephthalate fibres from an aqueous dispersion in clear blue shades which have excellent light, sublimation and wet fastness properties.

On alkylating this product with dimethyl sulphate, the corresponding N-monomethylamino-anthraquinone compound is obtained which has properties similar to those of the aminoanthraquinone compound described above.

EXAMPLE 6

2 parts of the finely milled dyestuff mixture obtained according to Example 2 are dispersed in 4000 parts of water. 12 parts of the sodium salt of o-phenylphenol and 12 parts of diammonium phosphate are added to this fine dispersion and 100 parts of polyglycol terephthalate fabric aer dyed for 1½ hours at 95–98°. The dyeing is rinsed and thoroughly washed with dilute sodium hydroxide solution and a dispersing agent, e.g. the condensation product of naphthalene sulphonic acid and formaldehyde. A blue dyeing which is fast to sublimation, light and wet is obtained.

EXAMPLE 7

2 parts of the finely milled dyestuff obtained according to Example 3 are dispersed in 4000 parts of water which contains 2 parts of a condensation product of naphthalene sulphonic acids and formaldehyde. The pH of the dyebath is adjusted to 6.5 with acetic acid. 100 parts of polyglycol terephthalate fabric are introduced at 40°, the bath is heated in an autoclave to 120° within 15 minutes and kept for 45 minutes at this temperature. The dyeing is rinsed with water and then soaped. In this way a clear violet dyeing is obtained which has excellent light, wet and sublimation fastness properties.

The following table shows the shades on polyglycol terephthalate fibres obtained with other dyestuffs which are produced analogously to the method described in the above examples.

TABLE

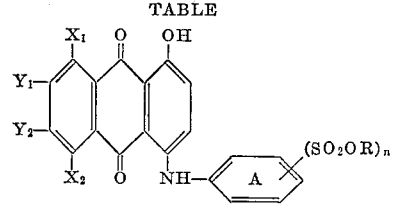

| Example No. | $X_1$ | $X_2$ | $Y_1$ | $Y_2$ | $-NH-\langle A \rangle(SO_2OR)_n$ | Shade on polyglycol terephthalate fibres |
|---|---|---|---|---|---|---|
| 8 | H | H | H | Cl | $-NH-\langle\rangle-SO_2O-\langle\rangle-CH_3$ | Violet. |

TABLE—Continued

| Example No. | X₁ | X₂ | Y₁ | Y₂ | $-NH-\phantom{A}(SO_2OR)_n$ | Shade on polyglycol terephthalate fibres |
|---|---|---|---|---|---|---|
| 9 | NH₂ | OH | H | H | —NH—C₆H₄—SO₂OC₅H₁₁ | Blue. |
| 10 | NH₂ | OH | H | H | —NH—C₆H₃(SO₂O—C₆H₅)₂ | Do. |
| 11 | NO₂ | OH | H | H | —NH—C₆H₂(SO₂O—C₆H₅)(OCH₃)(CH₃O) | Do. |
| 12 | NHCH₂CH₂CH₂OH | OH | H | H | —NH—C₆H₄—SO₂O—C₆H₅ | Do. |
| 13 | H | H | H | H | —NH—C₆H₄—SO₂OC₇H₁₅ | Violet. |
| 14 | H | H | H | H | —NH—C₆H₂(SO₂O—C₆H₄—OC₂H₅)(CH₃)(CH₃) | Do. |
| 15 | OH | NO₂ | H | H | —NH—C₆H₃(SO₂O—C₆H₄—Cl)(CH₃) | Blue. |
| 16 | NH₂ | OH | H | H | —NH—C₆H₄—SO₂O—C₆H₄—C₅H₁₁ | Do. |
| 17 | NHCH₃ | OH | H | H | —NH—C₆H₄—SO₂O—C₆H₄—CH₃ | Do. |
| 18 | H | H | H | H | —NH—C₆H₄—SO₂O—C₆H₅ | Violet. |
| 19 | OH | NHCH₂CH₂OH | H | H | —NH—C₆H₄—SO₂O—C₆H₄—CH₃ | Blue. |
| 20 | NO₂ | OH | H | H | —NH—C₆H₄—SO₂O—C₆H₅ | Do. |

TABLE—Continued

| Example No. | X₁ | X₂ | Y₁ | Y₂ | $-NH-A-(SO_2OR)_n$ | Shade on polyglycol terephthalate fibres |
|---|---|---|---|---|---|---|
| 21 | H | H | H | H | -NH-(4-Cl, 2-SO₂O-phenyl)phenyl | Violet. |
| 22 | H | H | H | H | -NH-(2,6-diCH₃-4-SO₂O-phenyl)phenyl | Do. |
| 23 | NHCH₂CH₂OCH₃ | OH | H | H | -NH-phenyl-SO₂O-C₆H₄-CH₃ | Blue. |
| 24 | OH | OH | H | H | -NH-phenyl-SO₂O-C₆H₄-C₂H₅ | Blue-violet. |
| 25 | NH₂ | OH | H | H | -NH-C₆H₄-SO₂O-C₆H₄-CH₃ | Blue. |
| 26 | H | H | H | H | -NH-phenyl-SO₂OCH₂-phenyl | Violet. |
| 27 | H | OH | H | H | -NH-phenyl-SO₂O-(3-Cl-phenyl) | Do. |
| 28 | H | H | Cl | Cl | -NH-(2-SO₂O-phenyl, 5-CH₃O)phenyl | Do. |
| 29 | OH | NO₂ | H | H | -NH-(2-SO₂O-(3-CH₃-phenyl), 5-Cl)phenyl | Blue. |
| 30 | H | H | H | H | -NH-phenyl-SO₂O-C₆H₄-OCH₃ | Violet. |
| 31 | NO₂ | OH | H | H | -NH-phenyl-SO₂O-C₆H₄-SO₂CH₃ | Blue. |
| 32 | H | H | H | H | -NH-phenyl-SO₂OC₄H₉ | Violet. |
| 33 | H | H | H | H | -NH-(2,4,6-triCH₃-3-SO₂O-phenyl)phenyl | Do. |

TABLE—Continued
| Example No. | X₁ | X₂ | Y₁ | Y₂ | —NH—A—(SO₂OR)ₙ | Shade on polyglycol terephthalate fibres |
|---|---|---|---|---|---|---|
| 34 | NO₂ | OH | H | H | 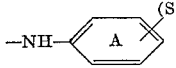 | Blue. |
| 35 | OH | NH₂ | H | H | 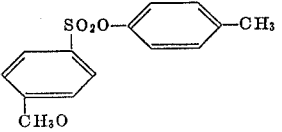 | Do. |
| 36 | H | H | H | H | 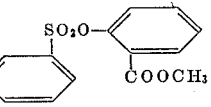 | Violet. |
| 37 | NO₂ | OH | H | H | 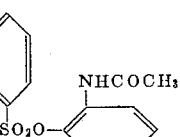 | Blue. |
| 38 | H | H | H | H | 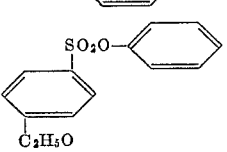 | Violet. |
| 39 | NH₂ | OH | H | H | 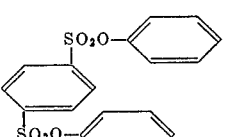 | Blue. |
| 40 | H | H | H | H | 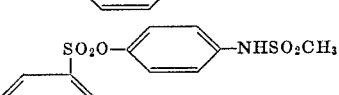 | Violet. |
| 41 | OH | NO₂ | H | H | 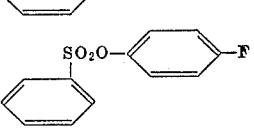 | Blue. |
| 42 | H | H | H | H | 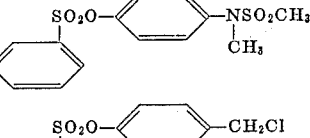 | Violet. |
| 43 | NH₂ | OH | H | H | 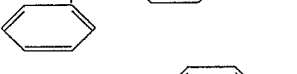 | Blue. |
| 44 | NH₂ | OH | H | H | 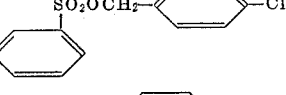 | Do. |
| 45 | OH | NH₂ | H | H | 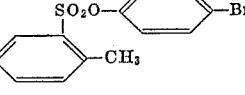 | Do. |
| 46 | H | OH | H | H | 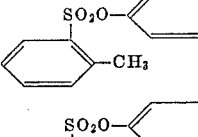 | Violet. |

TABLE—Continued

| Example No. | $X_1$ | $X_2$ | $Y_1$ | $Y_2$ | $-NH-A-(SO_2OR)_n$ | Shade on polyglycol terephthalate fibres |
|---|---|---|---|---|---|---|
| 47 | H | H | Cl | Cl | 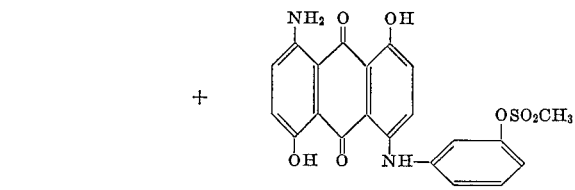 | Violet. |
| 48 | $NH_2$ | OH | H | H | 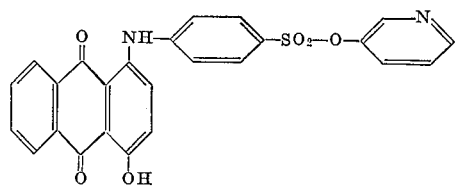 | Blue. |

EXAMPLE 49

A mixture of 33 parts of 1,5-dinitro-4,8-dihydroxyanthraquinone and 48.9 parts of 3-amino-6-methylbenzene sulphonic acid phenyl ester in 90 parts of nitrobenzene is stirred for 30 hours at 170–175°, then the nitrobenzene is distilled off by the introduction of steam. The resulting suspension of the condensation product in about 1000 parts of water is stirred with equal parts of pyridine, the dyestuff partly dissolves with a blue colour, and is then mixed at once with 11.2 parts of sodium hydrogen sulphide at a temperature of 85 to 90°. The reduction is completed after a few minutes at this temperature. Upon cooling of the solution and dilution with 1000 parts of cold water, the dyestuff having the formula

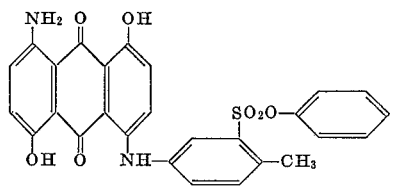

separates almost quantitatively and is filtered off and dried.

It melts at 210–211° and dissolves in organic solvents with a reddish blue colour, in concentrated sulphuric acid with a blue-green colour.

If it is dispersed in water, it dyes polyethyleneglycol terephthalate fibres in blue shades which have good light, sublimation and wet fastness properties.

EXAMPLE 50

39.45 parts of 3-amino-6-methylbenzene sulphonic acid phenol ester, 18.7 parts of methane sulphonic acid-3-aminophenol ester and 33 parts of 1,5-dinitro-4,8-dihydroxyanthraquinone in 100 parts of nitrobenzene are stirred for 20 hours at 170–175°. Then the reaction mixture is diluted with 175 parts of methanol, and the reaction products separate as a solid from the solution. They are isolated by filtration and again slurried at 90–95° in 100 parts of a 50% aqueous solution of pyridine. 11.2 parts of sodium hydrogen sulphide are added at once to this suspension, which is subsequently stirred for 15 minutes at 90–95°. By dropwise addition of 50 parts of water and cooling to room temperature, the reduction products are separated almost completely and are isolated by filtration. The mixture of dyestuffs obtained corresponds to the formulae

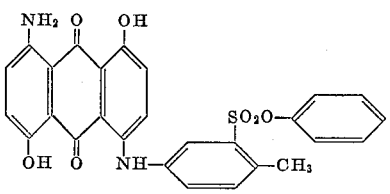

+

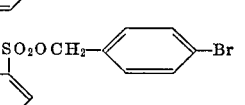

This mixture dissolves in organic solvents with a clear blue colour, in concentrated sulphuric acid with a blue-green colour.

If this dyestuff mixture is dispersed in water, it dyes cellulose triacetate fibres and polyethyleneglycol terephthalate fibres in deep blue shades which have good light, sublimation and wet fastness properties.

EXAMPLE 51

1-phenylamino-4-hydroxyanthraquinone is converted in the known way with chlorosulfonic acid into the corresponding dyestuff sulfonic acid chloride. 19 parts of 3-hydroxypyridine are added to the slurry of 36.4 parts of the finely pulverized sulfonic acid chloride so obtained in a solution of 200 parts of water, 150 parts of ethanol and 19 parts of sodium hydroxide. The reaction mixture is heated to 70–80° while stirring strongly, and stirring is continued for 12 hours at this temperature. After cooling the reaction mass, the dyestuff is filtered off under suction, washed with a lot of water and dried in vacuo. Its composition corresponds to the formula

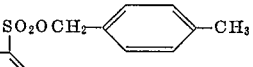

The dyestuff is a brown-violet powder. In finely distributed form it dyes polyglycol terephthalate fibers such as Terylene in clear violet shades. The dyeings are distinguished by particularly good fastness to light and sublimation.

If in the above process, the sulfonic acid chlorides obtained from 1-(2'-methyl-6'-phenylamino)-4-hydroxyanthraquinone, 1 - (2',6'-dimethylphenylamino)-4-hydroxyanthraquinone or 1 - (2',4',6'-trimethylphenylamino)-4-hydroxyanthraquinone are used, then products are obtained which have similar dyeing properties. Starting from the acid chlorides obtained by treatment of 1-phenylamino-4,8-dihydroxy-5-aminoanthraquinone or 1-phenylamino-4-aminoanthraquinone with chlorosulfonic acid, under the above conditions blue dyestuffs having similar dyeing properties are obtained.

EXAMPLE 52

35 parts of the sulfonic acid chloride obtained by treating 1-amino-2-phenoxy-4-hydroxyanthraquinone with chlorosulfonic acid, 19 parts of 3-hydroxypyridine and 19 parts of sodium carbonate in 150 parts of ethanol and 200 parts of water are heated for 10 hours at 80°. The red dyestuff which precipitates after cooling the reaction mixture is filtered off, washed first with ethanol and then with a lot of water and dried in vacuo at 70°. The product obtained corresponds to the formula

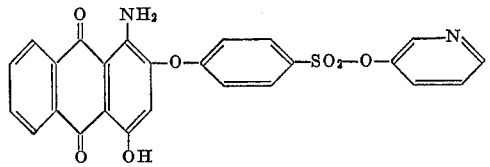

On milling this product with the sodium salt of a higher alkyl sulfate such as dodecyl sulfate, a dyestuff preparation is obtained which dyes polyester fibers such as Dacron in red shades, if necessary in the presence of o-phenylphenol. The dyeings are fast to washing and light and particularly fast to sublimation.

Similar products are obtained with the sulfonic acid chlorides obtained from 1-amino-2-(3'-methylphenoxy)-4-hydroxyanthraquinone, 1-amino-2-(2'-chlorophenoxy)-4-hydroxyanthraquinone or 1-amino-2-(2'-methoxyphenoxy)-4-hydroxyanthraquinone and chlorosulfonic acid.

We claim:
1. A dyestuff having affinity for polyester fibers, and being a member selected from the group consisting of
(a) a dyestuff of the formula

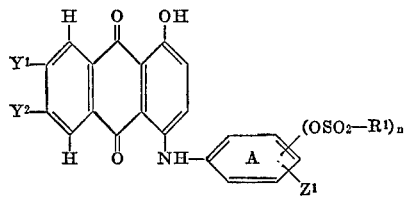

(b) a dyestuff of the formula

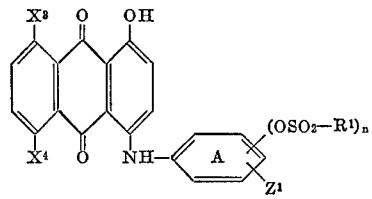

and (c) a dyestuff of the formula

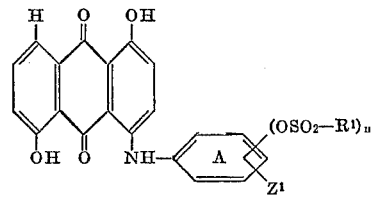

wherein
one of $X^3$ and $X^4$ is hydroxy and the other is a member selected from the group consisting of hydroxy, nitro, amino, lower alkyl-substituted amino, lower alkoxy-lower alkyl-substituted amino, and hydroxy-lower alkyl-substituted amino,
each of $Y^1$ and $Y^2$ is a member selected from the group consisting of hydrogen, chloride and bromine,
$R^1$ is a member selected from the group consisting of lower alkyl, lower alkenyl, chloro-lower alkyl, chloro-lower alkenyl, cycloalkyl of from 5 to 7 carbon atoms, phenyl, chlorophenyl, bromophenyl, fluorophenyl, lower alkyl phenyl, lower alkoxyphenyl, chloro-lower alkylphenyl, lower alkylsulfonyl-phenyl, lower alkylcarbonyl-phenyl, lower alkanoylamino-phenyl, and N-lower alkylsulfonyl-N-lower alkylphenyl,
$Z^1$ represents from one to two substituents selected from the group consisting of hydrogen, lower alkyl, lower alkoxy, chlorine, bromine and lower alkylsulfonyl, and
$n$ is one of the integers 1 and 2.

2. A dyestuff of the formula

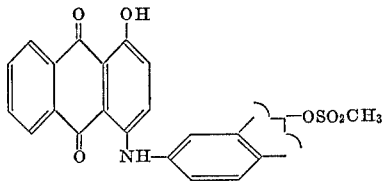

3. A dyestuff of the formula

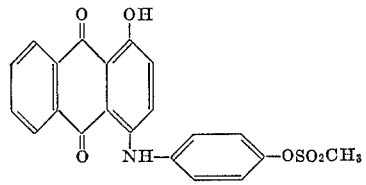

4. A dyestuff of the formula

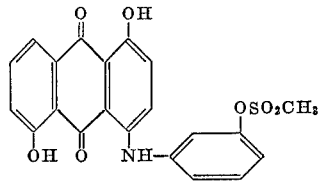

5. A dyestuff of the formula

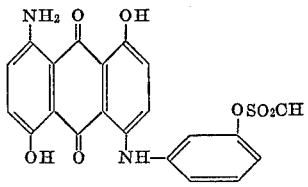

6. A dyestuff of the formula

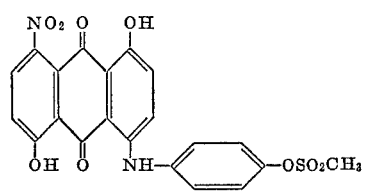

7. A dyestuff of the formula

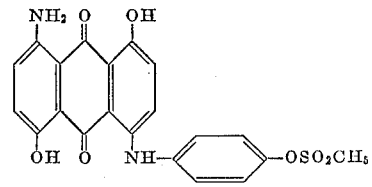

8. A dyestuff of the formula

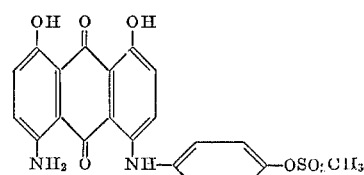

9. A dyestuff composition consisting essentially of a dyestuff of the formula

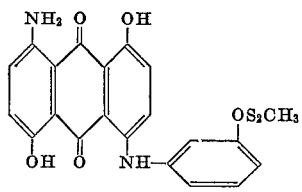

mixed with a dyestuff of the formula

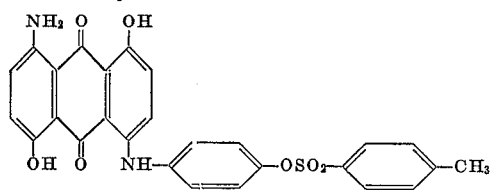

in a weight ratio of about 1:1.

10. A dyestuff having affinity for polyester fibers, and being a member selected from the group consisting of
(a) a dyestuff of the formula

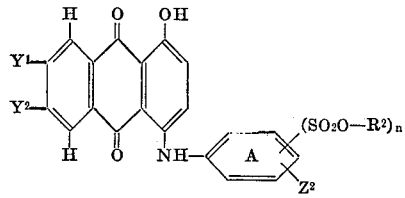

(b) a dyestuff of the formula

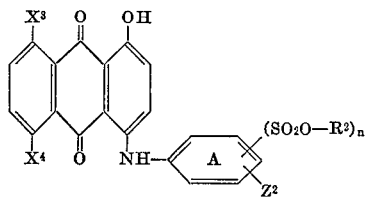

and
(c) a dyestuff of the formula

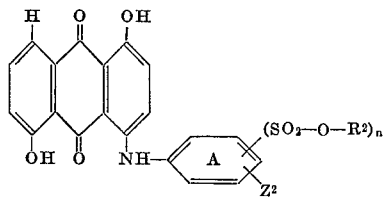

wherein
one of $X^3$ and $X^4$ is hydroxy and the other is a member selected from the group consisting of hydroxy, nitro, amino, lower alkyl-substituted amino, lower alkoxy-lower alkyl-substituted amino, and hydroxy-lower alkyl-substituted amino,
each of $Y^1$ and $Y^2$ is a member selected from the group consisting of hydrogen, chlorine and bromine,
$R^2$ is a member selected from the group consisting of alkyl of from 4 to 10 carbon atoms, chloro-lower alkyl, cycloalkyl of from 5 to 7 carbon atoms, phenyl, chlorophenyl, bromophenyl, fluorophenyl, lower alkylphenyl, lower alkoxyphenyl, chloro-lower alkyl-phenyl, lower alkylsulfonyl-phenyl, lower alkylcarbonyl-phenyl, lower alkanoylamino-phenyl, lower alkylsulfonyl-amino, N-lower alkylsulfonyl-N-lower alkyl-amino-phenyl, benzyl, chloro-benzyl, bromo-benzyl, lower alkyl-benzyl and pyridyl-3,
$Z^2$ represents from one to two substituents selected from the group consisting of hydrogen, lower alkyl, lower alkoxy, chlorine and bromine, and
$n$ is one of the integers 1 to 2.

11. A dyestuff of the formula

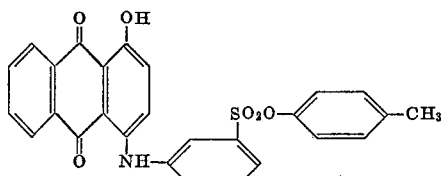

12. A dyestuff of the formula

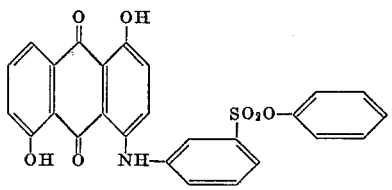

13. A dyestuff of the formula

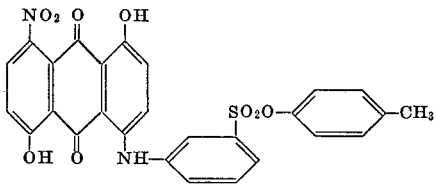

14. A dyestuff of the formula

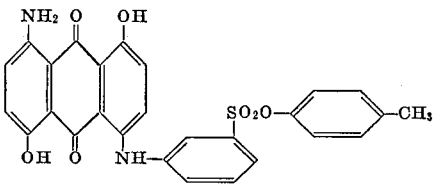

15. A dyestuff of the formula

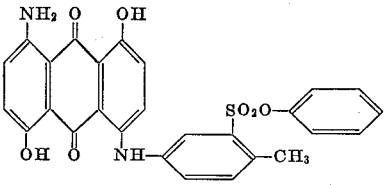

16. A dyestuff of the formula

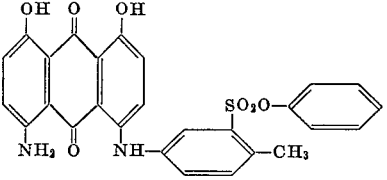

17. A dyestuff composition consisting essentially of a dyestuff of the formula

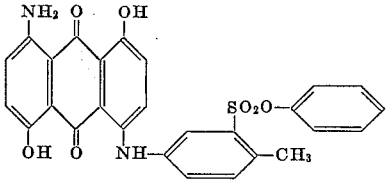

mixed with a dyestuff of the formula

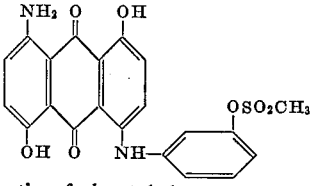

in a weight ratio of about 1:1.

(References on following page)

References Cited

UNITED STATES PATENTS

| | | | |
|---|---|---|---|
| 2,195,067 | 3/1940 | Weinand | 260—371 |
| 2,730,534 | 1/1956 | Hoefle et al. | 260—373 |
| 3,102,894 | 9/1963 | Lodge | 260—374 |
| 3,270,013 | 8/1966 | Hindermann et al. | 8—39 |
| 3,278,563 | 10/1966 | Hindermann et al. | 260—380 |

FOREIGN PATENTS

| | | |
|---|---|---|
| 928,619 | 6/1963 | Great Britain. |
| 1,309,675 | 10/1962 | France. |
| 1,309,676 | 10/1962 | France. |
| 394,441 | (n.a.) | Switzerland. |

LORRAINE A. WEINBERGER, *Primary Examiner.*

H. C. WEGNER, *Assistant Examiner.*

U.S. Cl. X.R.

8—39, 40; 260—373, 294.8